United States Patent
Campbell et al.

(10) Patent No.: US 10,843,787 B2
(45) Date of Patent: Nov. 24, 2020

(54) HEAT SHIELD ASSEMBLY AND MOUNTING THEREOF ON AIRCRAFT

(71) Applicant: The Boeing Company, Chicago, IL (US)

(72) Inventors: Lowell B. Campbell, Mukilteo, WA (US); Michael D. Jones, Kirkland, WA (US); Milan Stefanovic, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 309 days.

(21) Appl. No.: 15/940,898

(22) Filed: Mar. 29, 2018

(65) Prior Publication Data

US 2019/0300144 A1    Oct. 3, 2019

(51) Int. Cl.

| B64C 1/38 | (2006.01) |
|---|---|
| B64D 33/04 | (2006.01) |
| F02B 77/11 | (2006.01) |
| B64D 27/26 | (2006.01) |
| B64C 1/40 | (2006.01) |
| F02C 7/24 | (2006.01) |
| F02C 7/32 | (2006.01) |

(52) U.S. Cl.
CPC .................. *B64C 1/38* (2013.01); *B64C 1/40* (2013.01); *B64D 27/26* (2013.01); *F02B 77/11* (2013.01); *B64D 33/04* (2013.01); *B64D 2027/262* (2013.01); *F01N 2260/20* (2013.01); *F02C 7/24* (2013.01); *F02C 7/32* (2013.01); *F05D 2240/15* (2013.01)

(58) Field of Classification Search
CPC .. B64C 3/36; B64C 1/38; B64D 33/04; F01N 2260/20; F05D 2240/15
See application file for complete search history.

(56) References Cited

U.S. PATENT DOCUMENTS

| 4,717,094 A * | 1/1988 | Chee ...................... B64D 27/18 244/54 |
| 4,804,571 A * | 2/1989 | Jouffreau ................. B64G 1/58 244/117 A |
| 8,939,398 B2 | 1/2015 | Letay et al. |
| 2009/0095443 A1 | 4/2009 | Connelly |

(Continued)

FOREIGN PATENT DOCUMENTS

| EP | 0250 659 | 1/1988 |
| FR | 2983172 | 5/2013 |

OTHER PUBLICATIONS

Autodesk Support "How to Perform a Thermal Stress Analysis" Feb. 2, 2017.*

*Primary Examiner* — Philip J Bonzell
*Assistant Examiner* — Tye William Abell
(74) *Attorney, Agent, or Firm* — Haynes and Boone, LLP

(57) ABSTRACT

Various techniques provide a heat shield assembly and mounting thereof on an aircraft. In one example, a heat shield assembly may include flexible member. The heat shield assembly may further include a plurality of frame members disposed on the flexible member. The heat shield assembly may further include a plurality of mounting structures configured to directly mount the heat shield assembly to a strut of an airplane. Each of the plurality of mounting structures may be disposed on one of the plurality of frame members. Related methods are also provided.

20 Claims, 14 Drawing Sheets

(56) References Cited

U.S. PATENT DOCUMENTS

| | | | |
|---|---|---|---|
| 2009/0098321 A1* | 4/2009 | Zielinski | B64C 7/02 |
| | | | 428/34.6 |
| 2010/0051743 A1* | 3/2010 | Dumont | B64D 29/02 |
| | | | 244/54 |
| 2011/0155847 A1* | 6/2011 | Journade | A61P 11/00 |
| | | | 244/54 |
| 2013/0032662 A1* | 2/2013 | Dumont | B64D 29/02 |
| | | | 244/54 |
| 2013/0105622 A1* | 5/2013 | Journade | B64D 29/02 |
| | | | 244/54 |
| 2016/0001888 A1* | 1/2016 | Shephard | B64D 33/04 |
| | | | 244/130 |
| 2017/0259906 A1* | 9/2017 | Connelly | B64D 29/02 |
| 2018/0029688 A1* | 2/2018 | Connelly | B64C 1/40 |
| 2018/0057140 A1* | 3/2018 | Connelly | B64C 3/32 |

* cited by examiner

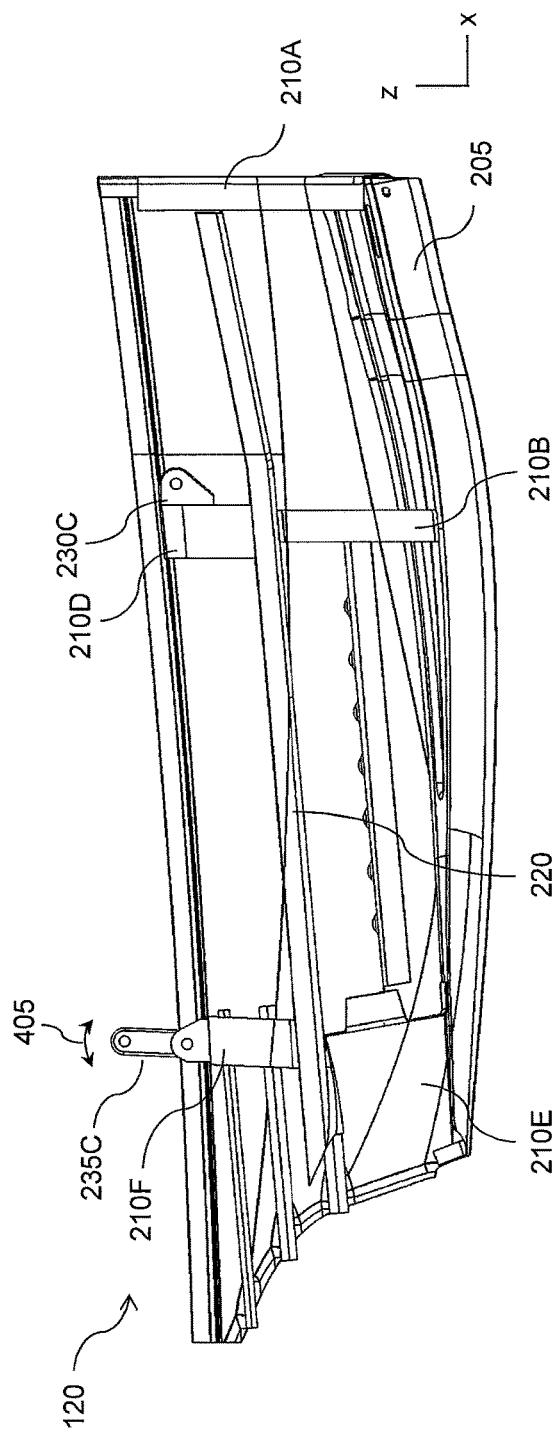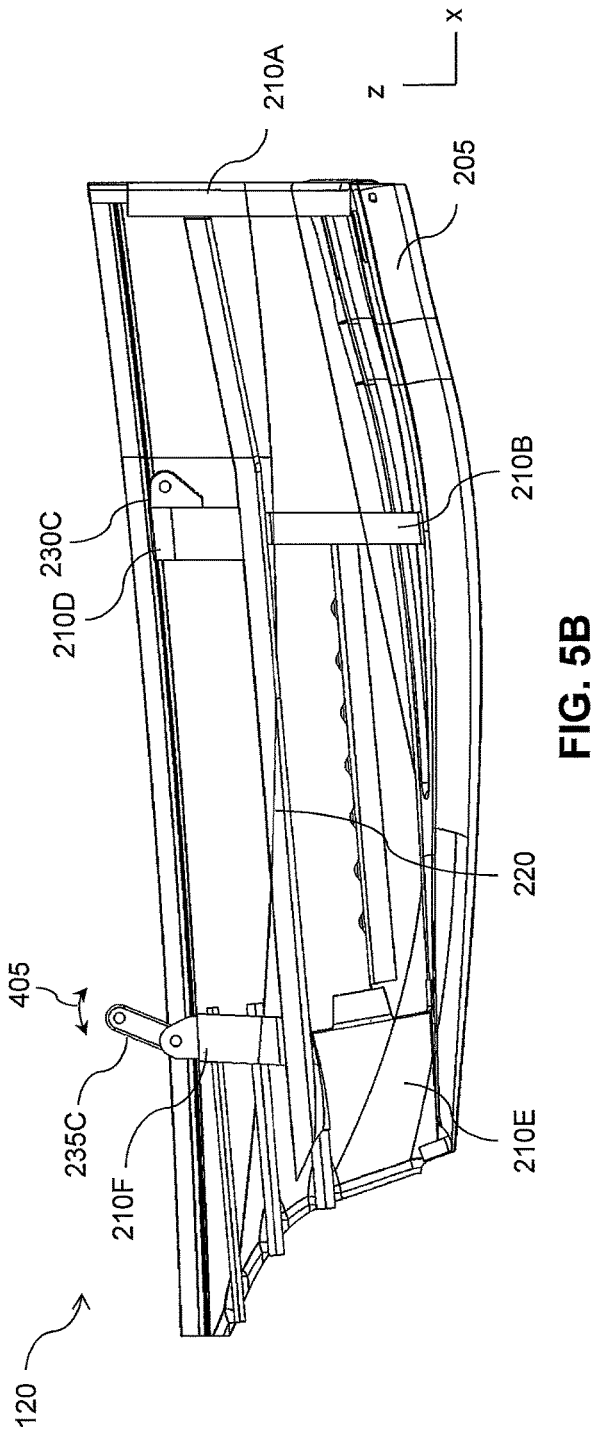

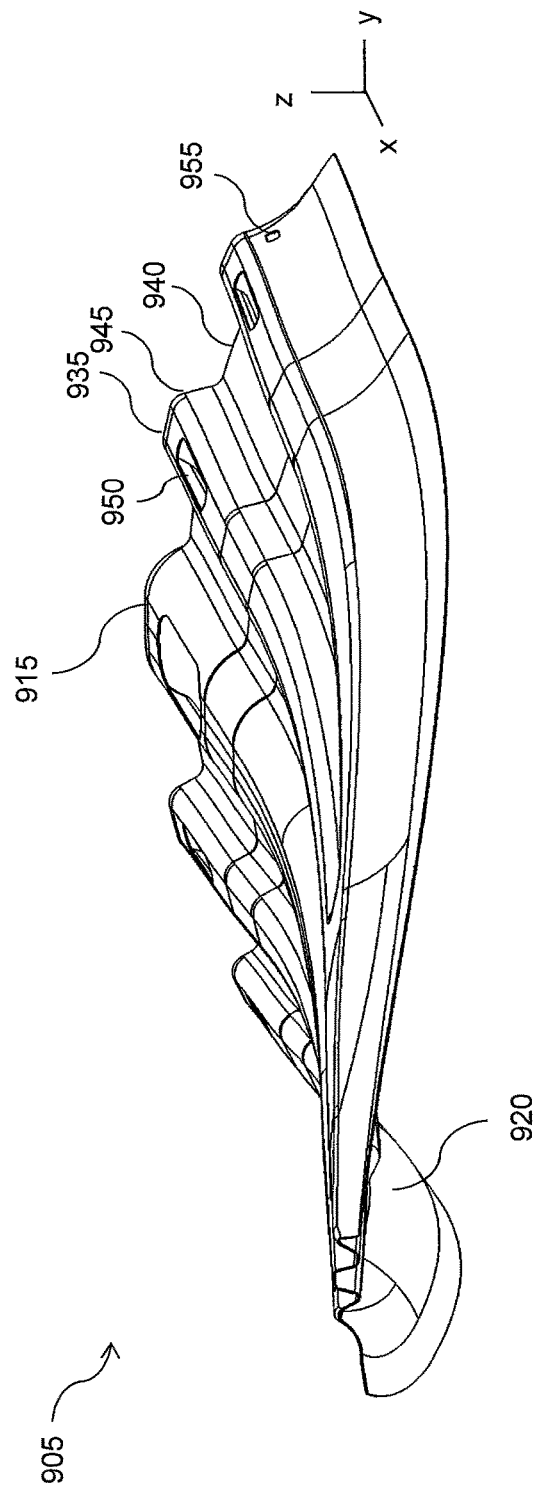
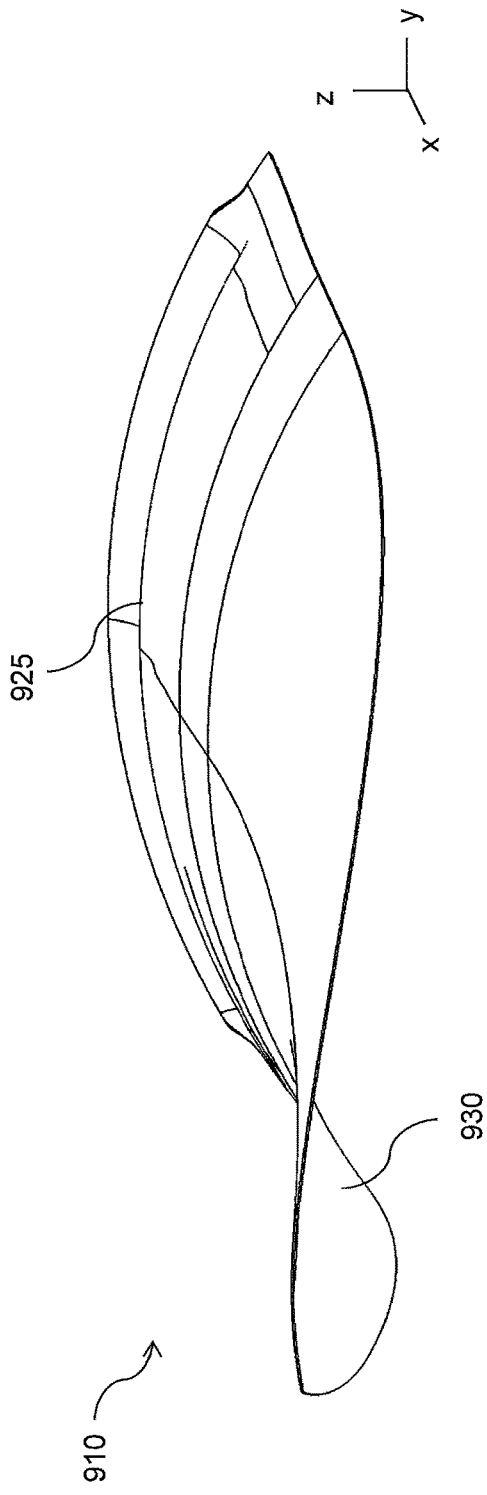
FIG. 9A
FIG. 9B

HEAT SHIELD ASSEMBLY AND MOUNTING THEREOF ON AIRCRAFT

BACKGROUND

Technical Field

The present application generally relates to facilitating heat management of an aircraft and, more specifically, to heat shield assembly and mounting thereof on an aircraft.

Related Art

A mounting pylon of each engine of an aircraft may couple the engine to the aircraft's wing. The pylon typically includes structural component (e.g., a strut) encased within a streamlining skin (e.g., a fairing). The mounting pylon may be proximate to hot exhaust from the engine. In some cases, a heat shield may be provided over at least an area of the strut close to the hot exhaust to prevent heat degradation of the strut.

SUMMARY

In accordance with various examples further discussed herein, a heat shield assembly and mounting of the heat shield assembly to a strut of an aircraft are provided. The heat shield assembly may be directly mounted to a strut. The heat shield assembly may include a flexible member with freedom of movement to allow thermal expansion. In some aspects, the flexible member may be mounted in a manner to allow the flexible member to change shape in one or more directions, such as in a direction along a width and a length of the flexible member, while maintaining aerodynamic curvature shape along at least a portion of the flexible member's surfaces when high temperature is applied to the flexible member.

According to an example, a heat shield assembly may include a flexible member. The heat shield assembly may further include a plurality of frame members disposed on the flexible member. The heat shield assembly may further include a plurality of mounting structures configured to directly mount the heat shield assembly to a strut of an airplane. Each of the plurality of mounting structures may be disposed on one of the plurality of frame members.

According to another example, a method may include forming an assembly fixture associated with the heat shield assembly. The assembly fixture may include a plurality of frame members. The method may further include mounting a flexible member to the assembly fixture. The method may further include attaching a plurality of mounting structures, where each of the plurality of mounting structures may be attached to one of the plurality of frame members. The method may further include mounting the plurality of mounting structures to corresponding mounting structures of a strut.

The scope of the invention is defined by the claims, which are incorporated into this section by reference. A more complete understanding of examples of the invention will be afforded to those skilled in the art, as well as a realization of additional advantages thereof, by a consideration of the following detailed description of one or more examples. Reference will be made to the appended sheets of drawings that will first be described briefly.

BRIEF DESCRIPTION OF THE DRAWINGS

FIG. 5A illustrates a side view of a heat shield assembly at a first temperature in accordance with one or more examples of the present disclosure.

FIG. 5B illustrates a side view of a heat shield assembly at a second temperature in accordance with one or more examples of the present disclosure.

FIG. 9A illustrates an upper piece of a flexible member in accordance with one or more examples of the present disclosure.

FIG. 9B illustrates a lower piece of a flexible member in accordance with one or more examples of the present disclosure.

Figure 1:
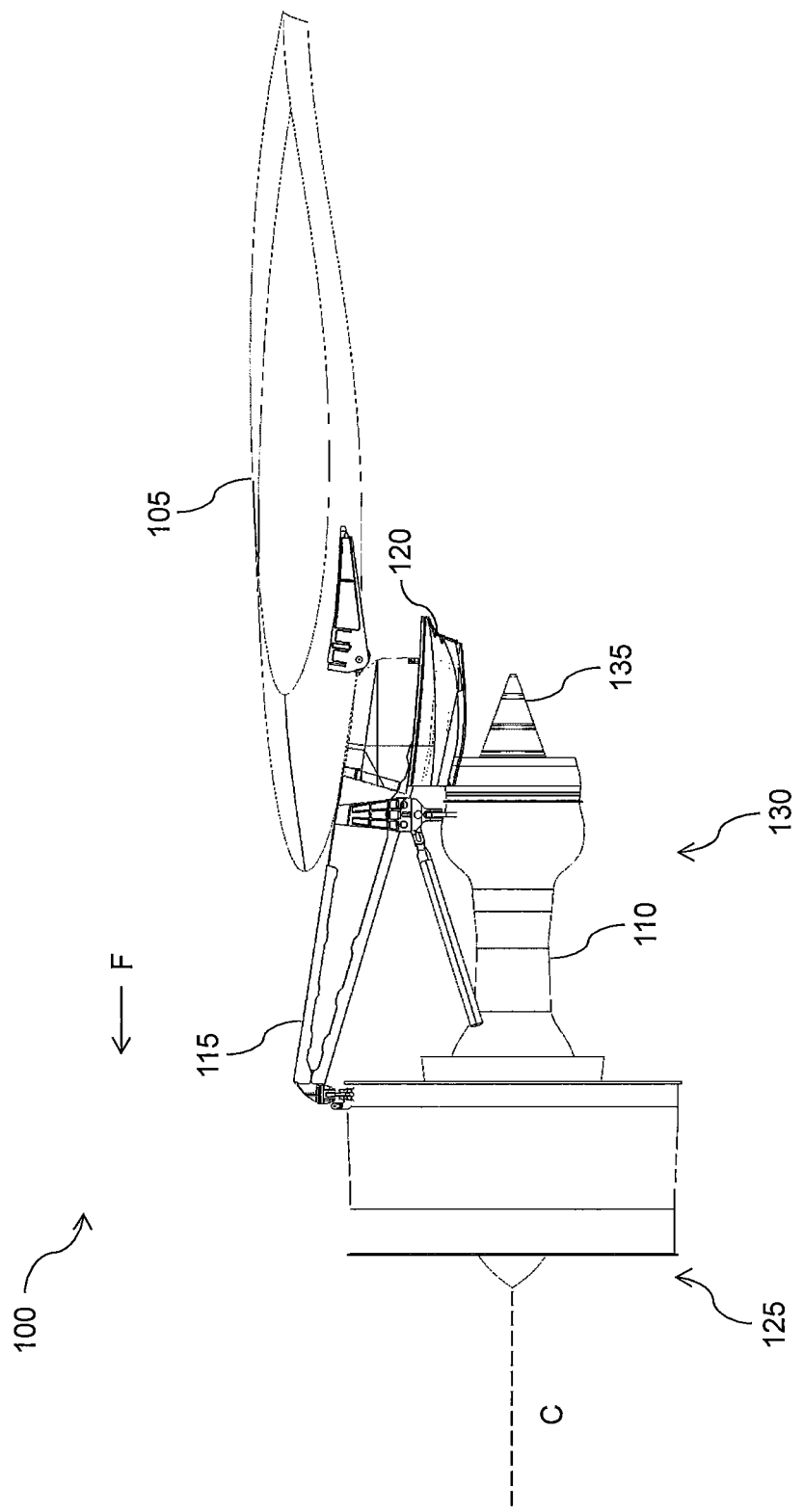
FIG. 1 illustrates a side view of a portion of an aircraft in accordance with one or more examples of the present disclosure.

Examples of the present disclosure and their advantages are best understood by referring to the detailed description that follows. It should be appreciated that like reference numerals are used to identify like elements illustrated in one or more of the figures, wherein showings therein are for purposes of illustrating examples of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more examples. In one or more instances, structures and components are shown in block diagram form in order to avoid obscuring the concepts of the subject technology. One or more examples of the subject disclosure are illustrated by and/or described in connection with one or more figures and are set forth in the claims.

In one or more examples, heat shield assemblies and methods for mounting heat shield assemblies to engine struts of aircrafts are provided. In some examples, a heat shield assembly is directly mounted to an engine strut (e.g., also referred to simply as a strut). The strut may couple an engine (e.g., jet engine) to a wing of an aircraft. The heat shield assembly may include a flexible member. In some aspects, the flexible member may have freedom of movement to allow thermal expansion. In this regard, the flexible member may be mounted in a manner to allow the flexible member to change shape in one or more directions, such as in a direction along a width and a length of the flexible member, while maintaining aerodynamic curvature shape along at least a portion of the flexible member's surfaces when high temperature is applied to the flexible member. During operation of the engine, the high temperature may be applied by heat from an exhaust gas of the engine.

In some aspects, the flexible member may be mounted and flexible in a predetermined manner, such that the flexible member does not push against any structures and maintains a thermal shape appropriate to protect at least the wing and strut from hot gas exhaust. A geometric shape of such a flexible member may be allowed to grow backwards and sideways as temperature increases. Such flexibility may be leveraged by having a point of attachment mounted with a predetermined degree of freedom when heated. For instance, the flexible member may be mounted with a degree of freedom to bend and flex longitudinally and axially. In some cases, an amount of flexibility of the heat shield assembly in general and the flexible member in particular may be predetermined by predicting a shape of the heat shield assembly and the flexible member using an analysis tool. In an aspect, the flexible member may be referred to as a heat shield.

Using various examples, integration of an aft fairing with an engine strut aerodynamically and structurally can be facilitated. Supporting the heat shield assembly above the engine exhaust from a strut box can provide allowance for relative motion between the wing and the engine. In some cases, by improving allowance for the relative motion, an aerodynamic closeout curvature for the strut aft fairing can begin further forward and a length of the fairing aft of the strut can be reduced, thus reducing wetted surface area which reduces drag and weight. In some cases, such an arrangement can reduce cost and improve maintenance access.

FIG. 1 illustrates a side view of a portion of an aircraft 100 in accordance with one or more examples of the present disclosure. The aircraft 100 includes a wing 105, an engine 110, a strut 115, and a heat shield assembly 120. The wing 105 can be fixedly connected to a fuselage of the aircraft 100. The engine 110 can be connected to the wing 105 using the strut 115. The engine 110 can be a jet engine, such as a high-bypass turbofan engine. The engine 110 can include an inlet side 125 and an outlet side 130 opposite from (e.g., longitudinally opposed from) the inlet side 125. The engine 110 can output an exhaust jet that propels the aircraft 100 in a forward direction (depicted as arrow F in FIG. 1). In some cases, a portion of the engine 110 can be enclosed within a nacelle (not shown) for streamlining purposes.

The heat shield assembly 120 can be connected to (e.g., directly connected to) the strut 115. In an example, as shown in FIG. 1, the heat shield assembly 120 can be mounted to an aft portion of the strut 115 and positioned proximate to an exhaust nozzle 135 of the engine 110 and an associated exhaust. The heat shield assembly 120 can be provided over the strut 115 to insulate the strut 115, wing 105, and other components proximate to the exhaust and prevent heat degradation of these components due to potential high temperatures of the exhaust. In some aspects, the heat shield assembly 120 can have an aerodynamic shape that facilitates air flow while reducing parasitic drag (e.g., since the exhaust gas can reach speeds that are supersonic). In an example, examples of struts to which a heat shield assembly can directly mount to are provided in U.S. Pat. No. 9,896,217, which is hereby incorporated by reference in its entirety.

Figure 2:
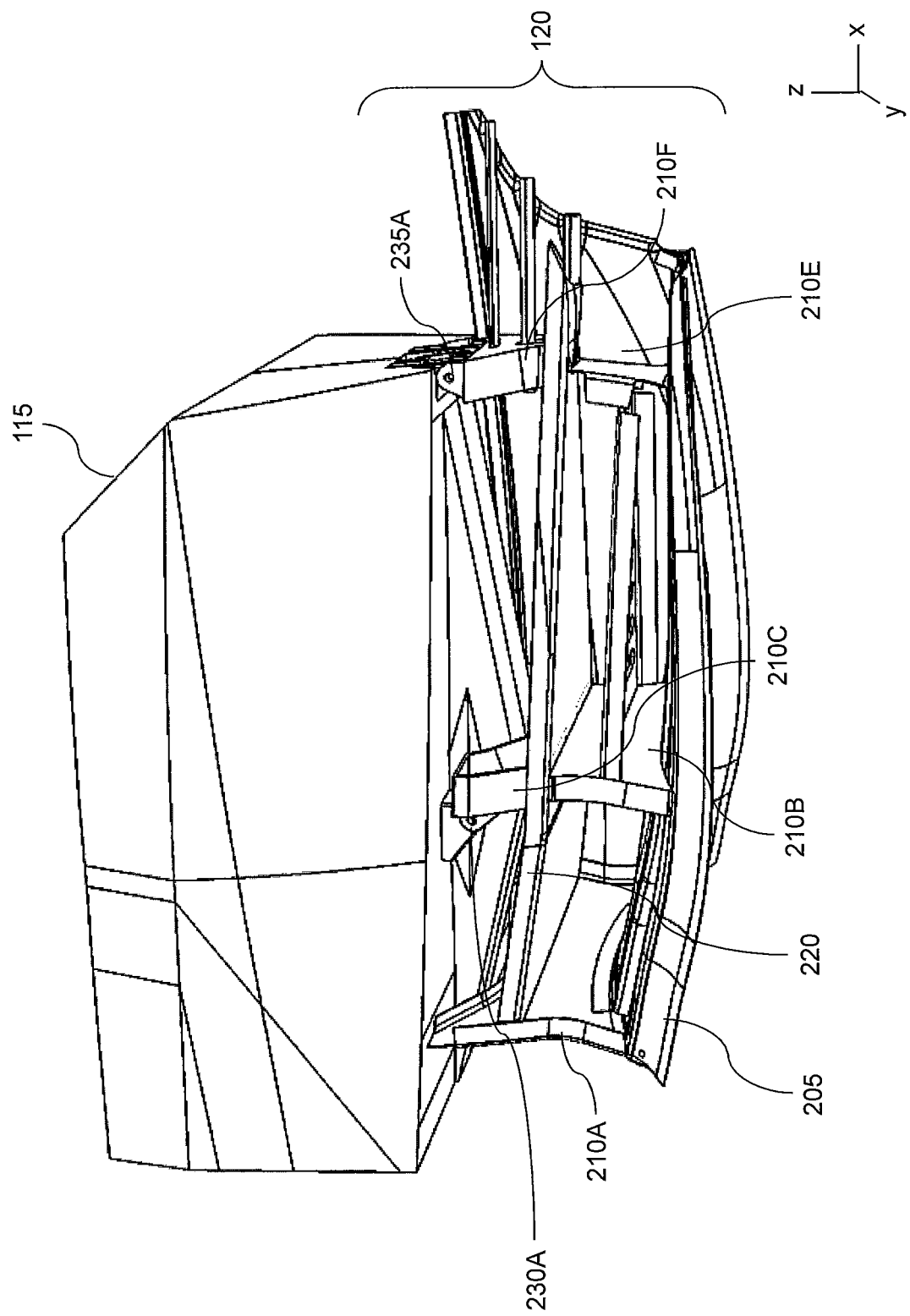
FIG. 2 illustrates a side view of a heat shield assembly and its connections to a strut of an aircraft in accordance with one or more examples of the present disclosure.

FIG. 2 illustrates a side view of the heat shield assembly 120 and its connections to the strut 115 in accordance with one or more examples of the present disclosure. FIGS. 3, 4, 5A, and 5B illustrate additional views of the heat shield assembly 120 in accordance with one or more examples of the present disclosure. As an example (shown in FIG. 4), a length L of the heat shield assembly 120 can be between 50-100 inches and a width W of the heat shield assembly 120 can be between 10-50 inches. For example, in certain applications, heat shield assembly 120 can be 54 by 13 inches, 60 by 22.5 inches, 93 by 41 inches, or other dimensions.

The heat shield assembly 120 includes a flexible member 205 (e.g., also referred to as a heat shield) and frame members 210A, 210B, 210C, 210D, 210E, and 210F (hereinafter 210A-F). The flexible member 205 can form a bottom wall of the heat shield assembly 120. The frame members 210A-210F are spaced apart along a longitudinal direction (e.g., x-direction) parallel with a centerline of the engine 110 (depicted as C in FIG. 1). The frame member 210A can be provided at a front portion of the heat shield assembly 120. For example, the frame member 210A can form a front wall of the heat shield assembly 120, with a front end of the flexible member 205 coupled to the frame member 210A. The frame members 210B, 210C, 210D, 210E, and 210F can be disposed on or above the flexible member 205. The frame members 210C and 210D can be stacked on top of the frame member 210B, and the frame member 210F can be stacked on top of the frame member 210E.

Figure 3:
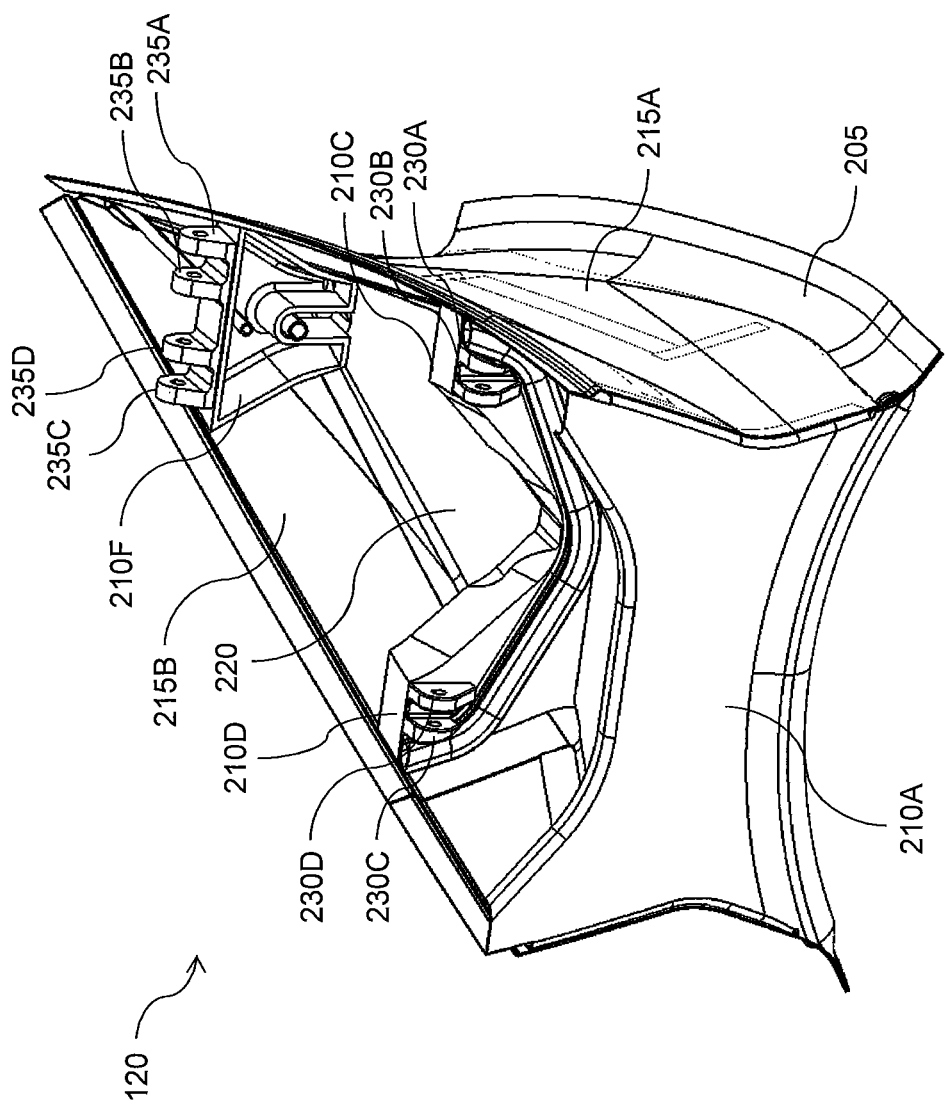
FIGS. 3 and 4 illustrate angled top views of a heat shield assembly in accordance with one or more examples of the present disclosure.

The heat shield assembly 120 can include side panels 215A and 215B that form side walls of the heat shield assembly 120 and, together with the flexible member 205 and frame member 210A, define an internal volume of the heat shield assembly 120. The side panels 215A and 215B can couple to the flexible member 205 and/or one or more of the frame members 210A-F. For example, as shown in FIG. 3, the side panels 215A and 215B can be disposed on the flexible member 205. It is noted that the side panels 215A and 215B are omitted, for example, in FIGS. 2, 5A, and 5B such that an internal structure of the heat shield assembly 120 can be depicted.

In some cases, as shown in FIG. 2, the heat shield assembly 120 can include a longitudinal panel 220 (e.g., also referred to as an intermediate cover). In other cases, the heat shield assembly 120 does not include the longitudinal panel 220. In cases that the longitudinal panel 220 is included, the longitudinal panel 220 can be coupled to the side panels 215A and 215B. The longitudinal panel 220 can separate the frame member 210B from the frame members 210C and 210D, and separate the frame member 210E from the frame member 210F. In this regard, an upper surface of the frame members 210B and 210E can be in direct contact with a lower surface of the longitudinal panel 220, and a lower surface of the frame members 210C, 210D, and 210F can be in direct contact with an upper surface of the longitudinal panel 220. The longitudinal panel 220 can divide the internal volume of the heat shield assembly 120 into an upper volume and a lower volume. The upper volume can include the volume above (e.g., upwards in the z-direction shown in FIG. 2) the longitudinal panel 220. In some cases, the longitudinal panel 220 can be formed using multiple pieces bonded together, rather than as one piece shown in FIGS. 2-4, 5A, and 5B.

The upper volume can provide a fluid containment volume, such as a flammable fluid containment volume. The longitudinal panel 220 can be attached to the side panels 215A and 215B of the heat shield assembly 120 using high temperature sealant to allow any flammable fluid to be contained within the fluid containment volume of the heat shield assembly. As such, in this example, such a fluid containment volume can be provided as part of (e.g., integral with) the structure of the heat shield assembly 120, rather than a separate containment structure coupled to a heat shield assembly.

The heat shield assembly 120 also includes mounting structures to facilitate mounting of the heat shield assembly 120 to the strut 115. The heat shield assembly 120 can include front end mounting structures 230A, 230B, 230C, and 230D (hereinafter "230A-D") and aft end mounting structures 235A, 235B, 235C, and 235D (hereinafter "235A-D"). In some cases, the front end mounting structures 230A-D can be, can include, or can be a part of forward pivot mounts for the heat shield assembly 120. The aft end mounting structures 235A-D can be, can include, or can be a part of, aft flexible mounts for the heat shield assembly 120. As an example, the front end mounting structures 230A-D and aft end mounting structures 235A-D can include clevis fittings.

In some cases, a cover (not shown) can be positioned over the frame members 210A, 210C, 210D, and 210F to enclose the internal volume of and form a top wall for the heat shield assembly 120. For example, the cover can have through holes through which the front end mounting structures 230A-D, aft end mounting structures 235A-D, and/or any other mounting structures can be exposed to facilitate mounting of the heat shield assembly 120 to the strut 115. In some cases, a cover is not provided as a top wall of the heat shield assembly 120 (e.g., the longitudinal panel 220 faces and is exposed to a bottom surface of the strut 115).

Figure 4:
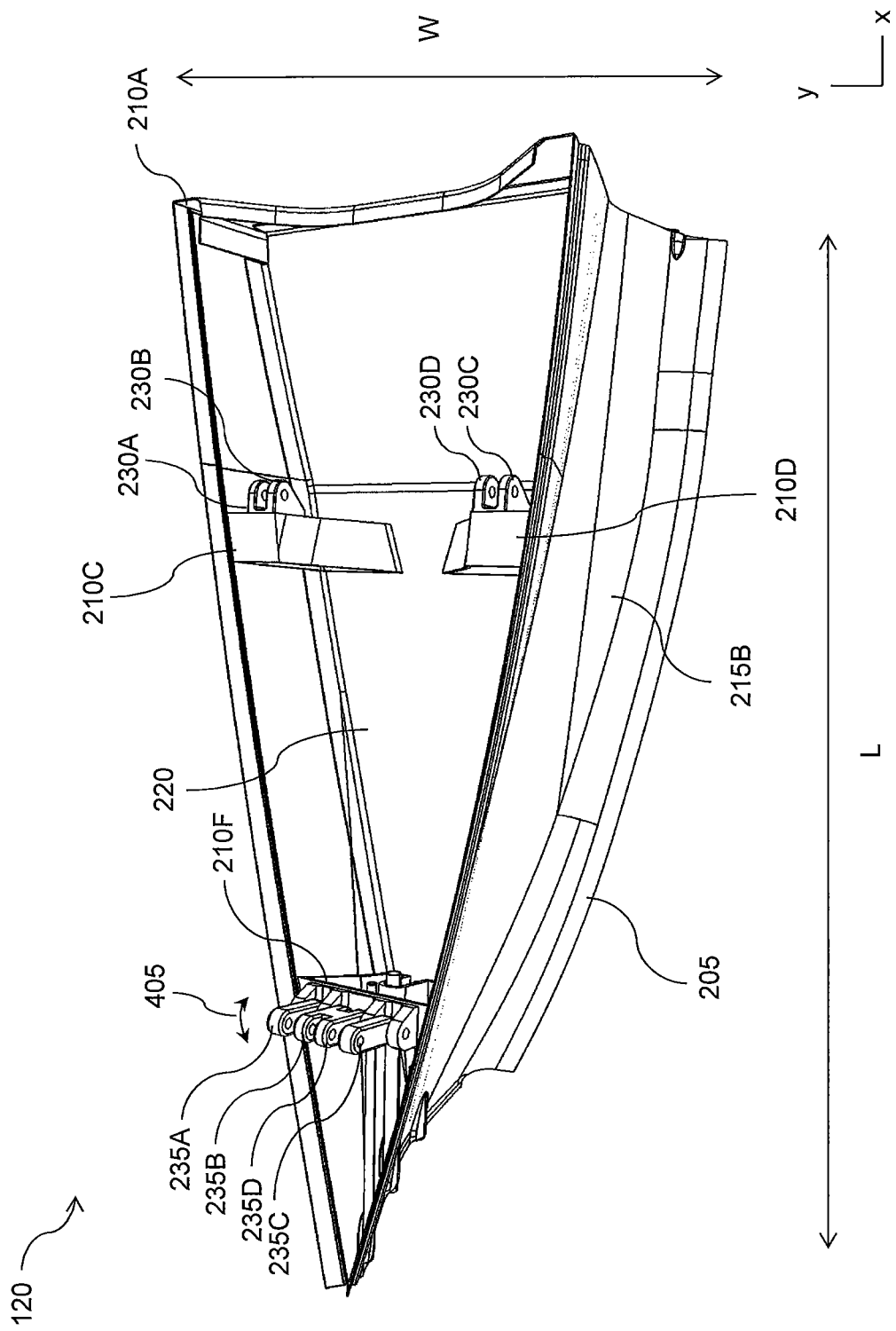

FIGS. 4, 5A, and 5B depict flexibility associated with the aft end mounting structures 235A-D via a rotational arrow 405. In this regard, FIGS. 5A and 5B illustrate mounting structures of the heat shield assembly 120 at different temperatures in accordance with one or more examples of the present disclosure. FIGS. 5A and 5B illustrate the front end mounting structures 230A-D and aft end mounting structures 235A-D in a cold position (e.g., at lower temperatures) and a hot position (e.g., at higher temperatures), respectively. In an example, the aft end mounting structures 235A-D can be flexible such that the aft end mounting structures 235A-D allow angular movement in response to an applied heat (e.g., heat from a hot exhaust). The front end mounting structures 230A-D can provide a pivot mount that is fixed in the x-direction. As an example, the aft end mounting structures 235A-D may be in the cold position shown in FIG. 5A when the aft end mounting structures 235A-D are in a temperature range from about 0° F. to about 120° F. The aft end mounting structures 235A-D angle may transition from the cold position to a hotter position shown in FIG. 5B as the lower surface 205 increases to a temperature of around 500° F. to about 1200° F.

Figure 6:
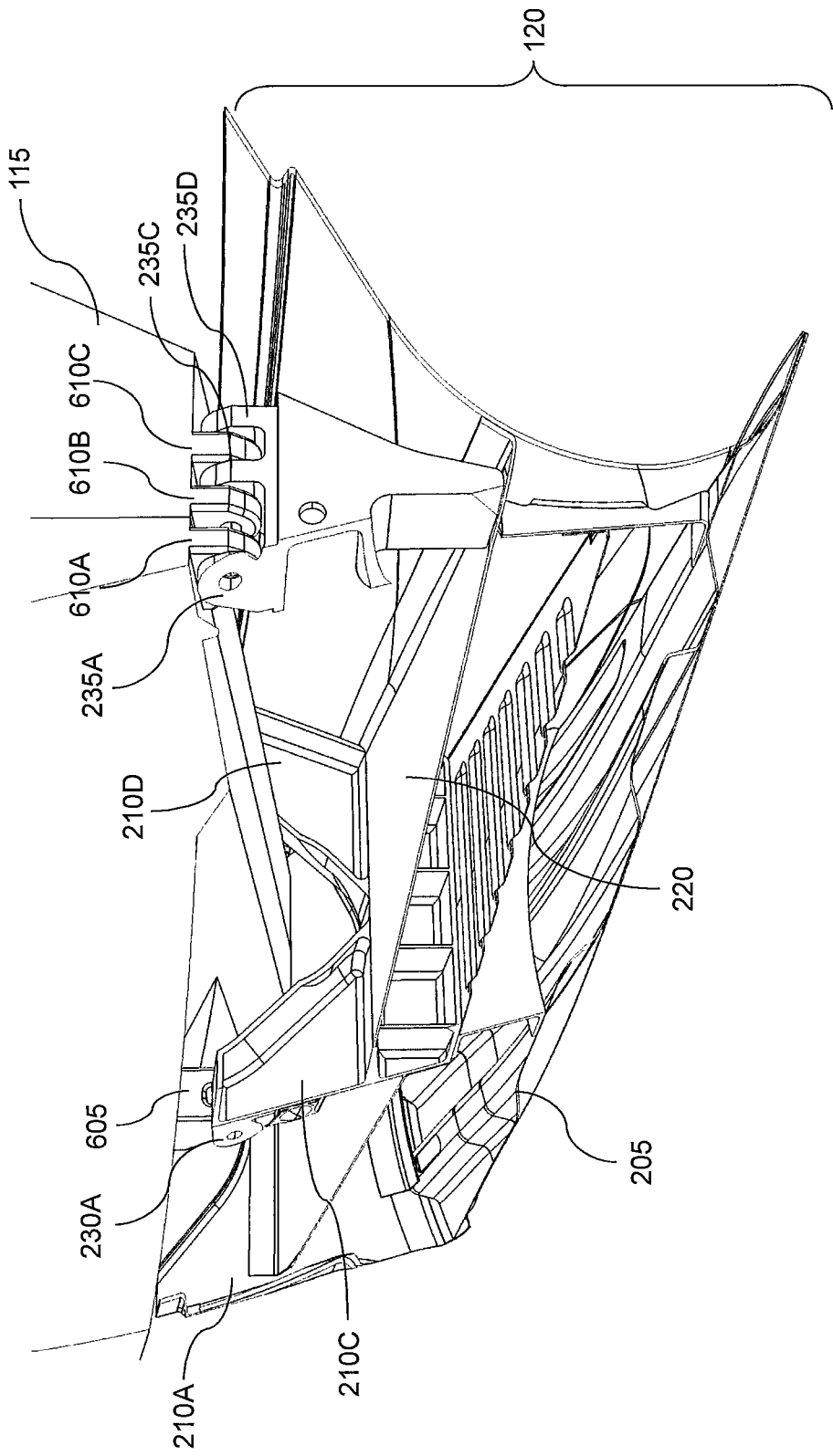
FIGS. 6 and 7 illustrate cutaways view of a heat shield assembly and its connections to a strut of an aircraft in accordance with one or more examples of the present disclosure.

FIG. 6 illustrates a cutaway view of the heat shield assembly 120 and its connections to the strut 115 in accordance with one or more examples of the present disclosure. The front end mounting structures 230A and 230B of the heat shield assembly 120 cab provide a clevis fitting that receives a corresponding front end mounting structure 605 of the strut 115. For example, the front end mounting structures 230A, 230B, and 605 can each have a through hole that can receive a common linking structure (e.g., a bolt) passing through the through holes. Similarly, the front end mounting structures 230C and 230D (not shown in FIG. 6) of the heat shield assembly 120 can form a clevis fitting that can receive a corresponding front end mounting structure (not shown) of the strut 115 (e.g., via a linking structure).

In some aspects, each pair of the aft end mounting structures 235A-D of the heat shield assembly 120 can provide a clevis fitting that receives a corresponding aft end mounting structure of the strut. As one example, in FIG. 6, the aft end mounting structures 235A and 235B can form a clevis fitting that receives an aft end mounting structure 610A of the strut 115. For example, the aft end mounting structures 235A, 610A, and 235B may have through holes that can receive one or more common linking structures (e.g., one or more bolts). It is noted that the aft end mounting structure 235B is obscured by the aft end mounting structures 610A and 610B in FIG. 6. The aft end mounting structures 235B and 235C can form a clevis fitting that receives an aft end mounting structure 610B of the strut 115. The aft end mounting structures 235C and 235D can form a clevis fitting that receives an aft end mounting structure 610C of the strut 115.

Figure 7:
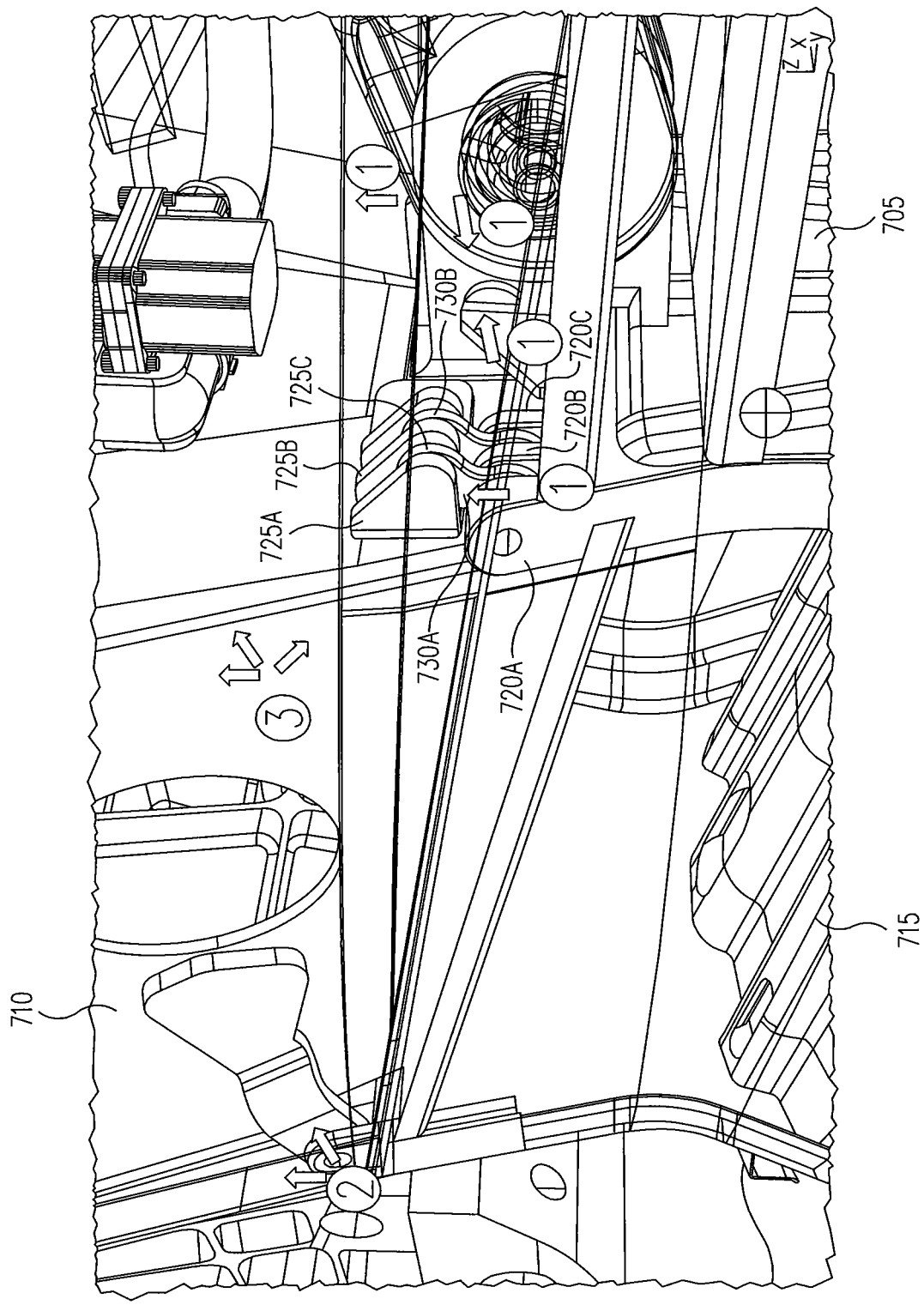

FIG. 7 illustrates a cutaway view of a heat shield assembly 705 and its connections to a strut 710 in accordance with one or more examples of the present disclosure. In some cases, the connections provided in FIG. 7 may be utilized alternatively to or in addition to the connections shown in FIG. 6. The heat shield assembly 705 includes a flexible member 715 and aft end mounting structures 720A, 720B, and 720C. The strut 710 includes aft end mounting structures 725A, 725B, and 725C. In an example, the heat shield assembly 705, strut 710, and flexible member 715 can be, can include, or can be a part of the heat shield assembly 120, strut 115, and flexible member 205 of FIG. 2. Linking structures 730A and 730B can be provided between the aft end mounting structures 720A, 720B, and 720C of the heat shield assembly 705 and the aft end mounting structures 725A, 725B, and 725C of the strut 710 to facilitate mounting of the heat shield assembly 705 to the strut 710. For example, a first end of the linking structure 730A can be provided between a clevis fitting formed by the aft end mounting structures 720A and 720B of the heat shield assembly 705, and a second end of the linking structure 730A can be provided between a clevis fitting formed by the aft end mounting structures 725A and 725B. To facilitate mounting of the heat shield assembly 705 to the strut 710, one or more bolts can be provided through the first end of the linking structure 730A and through holes of the aft end mounting structures 720A and 720B, and one or more bolts can be provided through the second end of the linking structure 730A and through holes of the aft end mounting structures 725A and 725B.

Heat shield assembly 705 can be constrained so that different portions of heat shield assembly 705 are constrained in various directions and can, thus, have varying degrees of freedom. For example, heat shield assembly 705 can be fixed in the x,y & z directions at location (3). At location (2), heat shield assembly 705 can only be constrained in the x & z directions so that heat shield assembly 705 and/or flexible member 715 can flex in the y direction without affecting strut 710. At locations (1)(z), heat shield assembly 705 is constrained only in the z direction to prevent rotation about an axis from (3) to (2). Unidirectional restraint at locations (1)(y) prevent heat shield assembly 705 from moving side to side in reaction to external aerodynamic loads. Such a mounting arrangement allows heat shield assembly 705 to change shape without passing that deformation through rigid attachments into strut 710.

Figure 8:
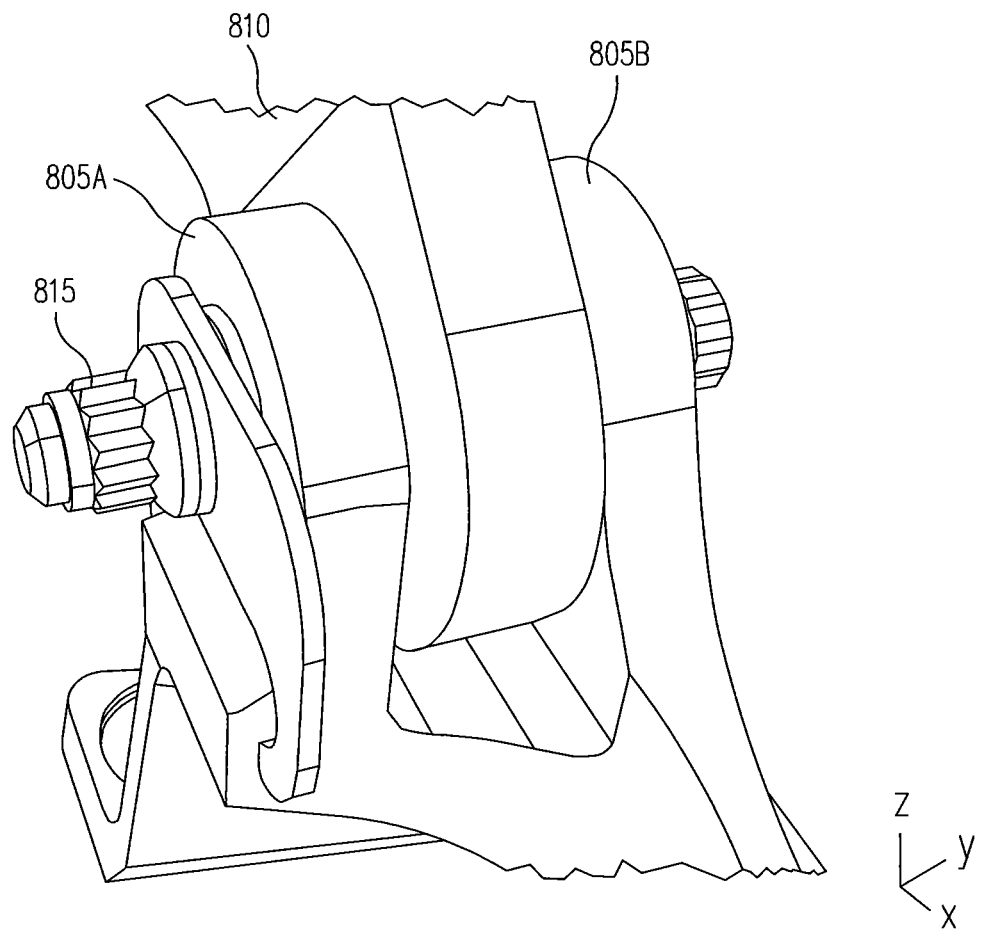
FIG. 8 illustrates a zoomed-in view of a clevis fitting formed by mounting structures and other associated components in accordance with one or more examples of the present disclosure.

FIG. 8 illustrates a zoomed-in view of a clevis fitting formed by mounting structures 805A and 805B and associated components in accordance with one or more examples of the present disclosure. As shown in FIG. 8, the clevis fitting can receive a structure 810. A bolt 815 can pass through the through holes of the mounting structures 805A and 805B and structure 810 to fasten the mounting structure 805A and 805B to the structure 810. In an example, the mounting structures 805A and 805B may be a pair of mounting structures (e.g., the aft end mounting structures 235A and 235B) provided by a heat shield assembly (e.g., the heat shield assembly 120). In this example, the structure 810 can be provided by a mounting structure (e.g., the aft end mounting structure 610A) provided by the strut or a linking structure (e.g., the linking structure 730A) provided between the heat shield assembly and the strut. In another example, the mounting structures 805A and 805B can be provided by the strut. The mounting structures 805A and 805B can be utilized as aft end mounting structures and/or as front end mounting structures. Although FIGS. 6-8 are described with reference to clevis fittings on a heat shield assembly to receive mounting structures of a strut, in some examples the clevis fittings can be provided on the strut to receive mounting structures of the heat shield assembly. In other examples, other types of mounting structures can be utilized by the heat shield assembly and/or strut.

In an example, the heat shield assembly 120 can be mounted to the strut 115 such that the heat shield assembly 120 has negligible relative motion in relation to the strut 115 while having flexibility in a predetermined aerodynamic shape when exposed to high temperature (e.g., from the exhaust gas of the engine 110). In this regard, thermal expansion of the heat shield assembly 120 may be facilitated by mounting the heat shield assembly 120 to the strut 115 using the front end mounting structures 230A-D, aft end mounting structures 235A-D, and corresponding mounting structures of the strut 115. In some cases, when exposed to high temperature, the flexible member 205 of the heat shield assembly 120 may change shape, such as bending and flexing longitudinally and axially, while maintaining aerodynamic curvature shape along at least a portion of the surfaces of the flexible member 205.

It is noted that the various components of the heat shield assembly 120 and the strut 115 shown in FIG. 2 (and other figures) are provided by way of non-limiting example. Not all of the depicted components may be required, however, and one or more implementations may include additional components not shown in the figures. Variations in the arrangement and type of the components may be made without departing from the spirit or scope of the claims as set forth herein. Additional components, different components, or fewer components may be provided.

As one example, the frame member 210A may be provided as multiple frame members stacked on top of each other to extend from a bottom portion of the heat shield assembly 120 (e.g., adjacent the flexible member 205) to an upper portion of the heat shield assembly 120 (e.g., facing the strut 115). As another example, the frame members 210E and 210F may be provided as a single frame member. As another example, although the side panel 215A and the side panel 215B are each shown as a single panel, the side panel 215A and/or 215B may each be provided as a multiple panels coupled together. As another example, fewer or more mounting structures may be provided on the strut 115 and/or heat shield assembly 120.

Connections between the flexible member 205, the frame members 210A-F, side panels 215A and 215B, longitudinal panel 220, front end mounting structures 230A-D, and/or aft end mounting structures 235A-D may be effected using various techniques, such as by welding and/or with mechanical fasteners (e.g., rivets, nuts/bolts, etc.). The various components that form the heat shield assembly 120, such as the flexible member 205, frame members 210A-E, side panels 215A and 215B, and longitudinal panel 220, may provide structural integrity for the heat shield assembly and/or heat insulating capability.

The various components of heat shield assembly 120 may be made of Ceramic Matrix Composite (CMC) or alloys of titanium or steel capable of high temperature. As the operating temperature is less severe further away from flexible member 205, the longitudinal panel 220, the frame members 210A-F, and mounting structures 230A-D and 235A-D may optionally be made of lower cost materials such as aluminum.

Figure 9C:
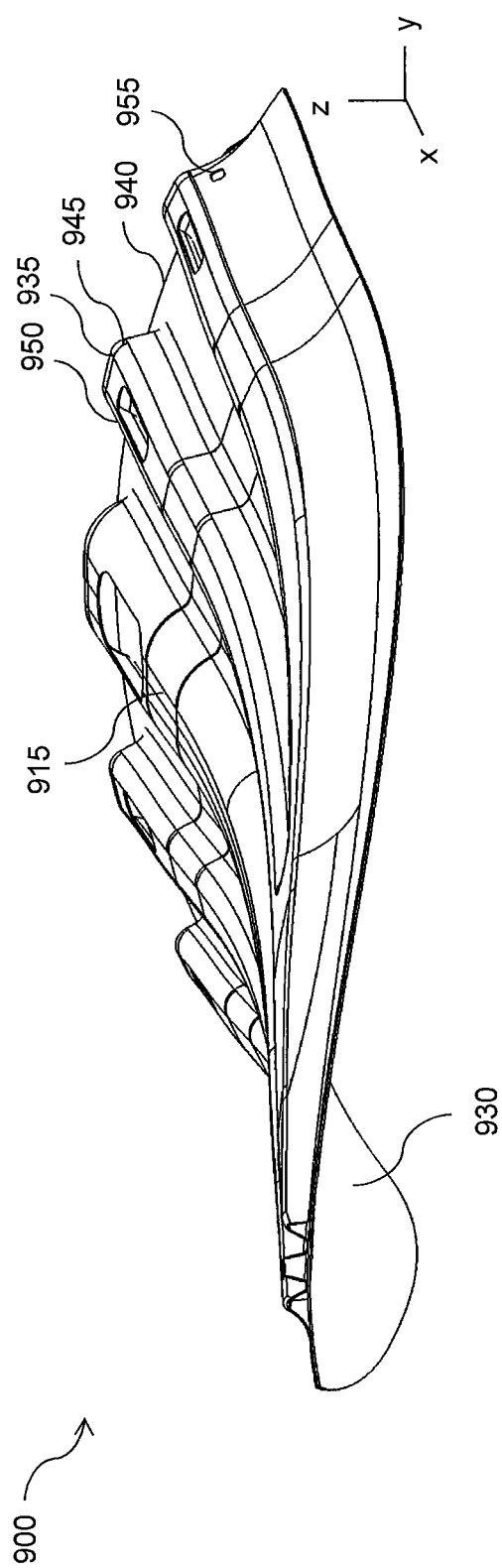
FIG. 9C illustrates a flexible member formed by the upper piece of FIG. 9A and the lower piece of FIG. 9B, in accordance with one or more examples of the present disclosure.

FIGS. 9A, 9B, and 9C illustrate an example of an upper piece 905, a lower piece 910, and a flexible member 900 formed of the upper piece 905 and lower piece 910, respectively, in accordance with one or more examples of the present disclosure. In an example, the flexible member 900 can be, can include, or can be a part of, the flexible member 205 of FIG. 2. The flexible member 900 includes the upper piece 905 and the lower piece 910. The upper piece 905 has an upper surface 915 and a lower surface 920. The upper surface 915 may face a lower surface of a strut (e.g., the strut 115) to which a heat shield assembly (e.g., the heat shield assembly 120) is attached. The lower piece 910 has an upper surface 925 and a lower surface 930. The lower surface 930 may be proximate to an exhaust region of an engine (e.g., the engine 110).

In some aspects, the upper piece 905 can be formed to include longitudinal stiffeners (e.g., integral longitudinal stiffeners). For example, the longitudinal stiffeners 915 and 935 can be provided on upper piece 905. In some cases, the longitudinal stiffeners can be mounted to allow flexibility along a length and a width of the flexible member 900, such that the flexible member 900 has freedom to move along the length and the width (e.g., in an unconstrained manner). The longitudinal stiffeners can be formed by a ceramic matrix composite (CMC) to allow such flexibility when the flexible member 900 is heated. As an example, the length (e.g., x-direction) and the width (e.g., y-direction) of the flexible member 900 can be around 4 ft and 2 ft, respectively. As the air moves along the heat shield in the longitudinal direction, the lower surface 930 of the lower piece 910 can provide an aerodynamic surface that facilitates air flow along the lower surface 930 while minimizing or eliminating shape distortion (e.g., wrinkling). Any wrinkling may be length-wise along the longitudinal direction rather than side-to-side in the case that lateral stiffeners are utilized. An example high temperature that may be applied to the longitudinal stiffeners may be around 1100° F. or higher.

In an example, the upper piece 905 and lower piece 910 may each be a continuous piece (e.g., rather than each being multiple pieces bonded together). In some aspects, the upper piece 905 and the lower piece 910 are bonded together (e.g., permanently bonded together) to form the flexible member 900. In these aspects, the lower surface 920 of the upper piece 905 is bonded to (e.g., permanently bonded to) the upper surface 925 of the lower piece 910. In certain examples, upper piece 905 can stiffen lower piece 910 when upper piece 905 is coupled or bonded to lower piece 910 to form flexible member 900.

In some cases, the upper piece 905 and lower piece 910 may be bonded together without using mechanical fasteners. As an example, when the upper piece 905 and lower piece 910 are formed of CMC, the upper piece 905 and lower piece 910 may be bonded together by sintering the upper piece 905 and lower piece 910 together. In this regard, the upper piece 905 and lower piece 910 may be formed separately and sintered together (e.g., or other high temperature fusing). In some cases, the CMC may be utilized for the lower surface 930 of the lower piece 910, since this is the component on which the heat exhaust impinges most directly. In some aspects, the mounting scheme adds no load or minimal load to the lower piece 910 to avoid having additional stress that may cause the CMC of the lower piece 910 to degrade (e.g., crack). As another example, the upper piece 905 and lower piece 910 may be formed from or include titanium. In such a case, the upper piece 905 and lower piece 910 may be bonded together using super plastic forming diffusion bonding (SPF-DB) of titanium sheets. The upper piece 905 and the lower piece 910 could be made from different materials, including high temperature steel alloy (e.g., Inconel®), as long as the Coefficient of Thermal Expansion (CTE) is matched so that internal buckling is avoided. If titanium is not used for both upper piece 905 and lower piece 910, then alternate to diffusion bonding may be required, such as mechanical fastening or welding.

In some examples, by forming each of the upper piece 905 and lower piece 910 of the flexible member 900 as a continuous piece and directly mounting (e.g., installing) a heat shield assembly (e.g., the heat shield assembly 120) that includes the flexible member 900 to the strut (e.g., the strut 115), potential gas leaks can be mitigated as there are no gaps. This is in contrast to a flexible member being formed using multiple pieces, with gaps between the pieces being sealed. Gaps may still be present between the sealed pieces such that leakage may occur. Such hot gas leakage may push into the heat shield assembly and reach hydraulic components and other components/equipment in the strut. In some cases, the seal between the separate pieces may degrade over time due to high heat and allow an increasing amount of gas to leak through as the heat shield ages.

The upper piece 905 can provide a fluted surface (e.g., with ridges and depressions) and the lower piece 910 can provide an aerodynamic surface to facilitate air flow. For example, the fluted surface can provide a ridge 935, depression 940, and sloped portion 945 between the ridge 935 and the depression 940. The flutes form the longitudinal stiffener required to hold aerodynamic shape while allowing the flexible member to expand when heated. An opening 950 may be defined on the ridge 935. In some cases, as shown in FIG. 9A, the upper piece 905 can include air scoops, such as an air scoop 955. The opening 950 and air scoop 955 can be perforations that extend through an entirety of the thickness of the upper piece 905. In other examples, the air scoops are not included.

Figure 10:
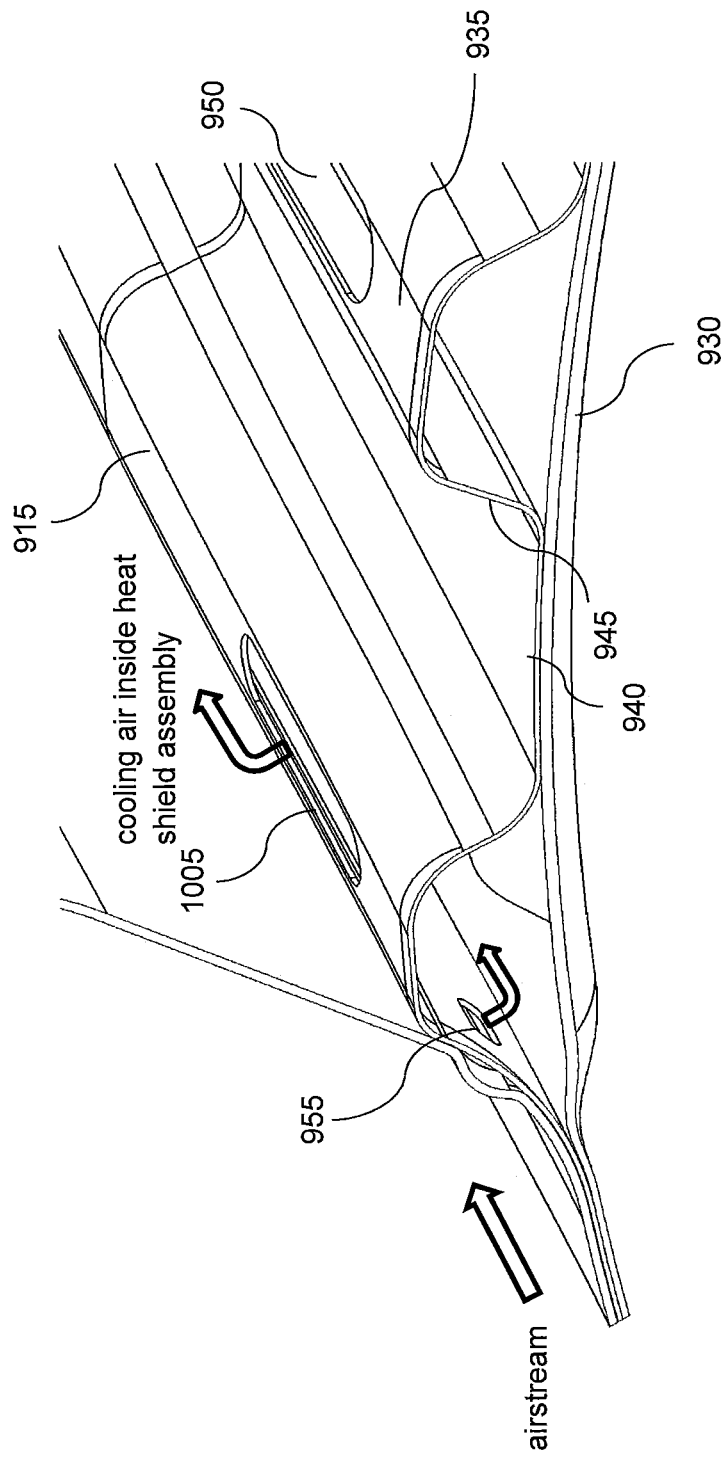
FIG. 10 illustrates an example of airflow through the flexible member of FIG. 9C in accordance with one or more examples of the present disclosure.

FIG. 10 illustrates an example of airflow through the flexible member 900 of FIG. 9C in accordance with one or more examples of the present disclosure. The air scoop 955 may be aligned with a fan flow stream to put pressure inside the flexible member 900 to cause the air to escape through openings located in an aft lower portion of the flexible member 900, such as an opening 1005 and/or the opening 950. This small amount of air is a natural convective current that will cool the inside of the heat shield assembly that includes the flexible member 900, thus creating better heat protection for components above the flexible member 900 and above the heat shield assembly.

Figure 11:
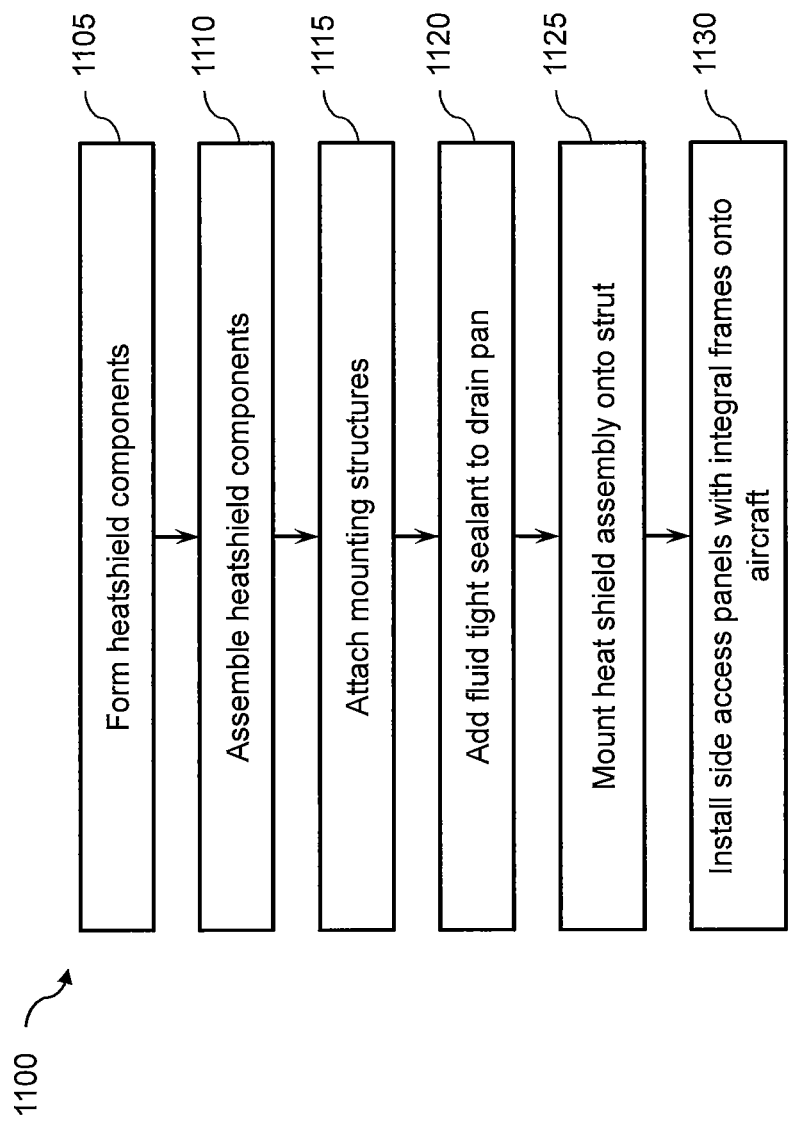
FIG. 11 illustrates a flow diagram of an example process for mounting a heat shield assembly to a strut of an aircraft in accordance with one or more examples of the present disclosure.

FIG. 11 illustrates a flow diagram of an example process 1100 for mounting a heat shield assembly to a strut of an aircraft in accordance with one or more examples of the present disclosure. For explanatory purposes, the example process 1100 is described herein with reference to the heat shield assembly 120 and strut 115 of FIG. 2; however, the example process 1100 is not limited to the heat shield assembly 120 and strut 115 of FIG. 2. Note that one or more operations may be combined, omitted, and/or performed in a different order as desired.

At block 1105, the components of the heat shield assembly 120 are formed. At block 1110, to form the assembly, the frame members 210A-F, side panels 215A and 215B, longitudinal panel 220, and/or other components may be provided and appropriately coupled together. For example, connections between the frame members 210A-F, side panels 215A and 215B, and/or longitudinal panel 220 may be effected using various techniques, such as by welding and/or with mechanical fasteners (e.g., rivets, nuts/bolts, etc.). At block 1115, the front end mounting structures 230A-D and aft end mounting structures 235A-D are attached. For example, the front end mounting structures 230A and 230B may be attached to the frame member 210C, front end mounting structures 230C and 230D may be attached to the frame member 210D, and aft end mounting structures 235A-D may be attached to the frame member 210F.

At block 1120, fluid tight sealant is provided to a drain pan formed by a fluid containment volume defined in the heat shield assembly 120. In some cases, the longitudinal panel 220 may be attached to the side panels 215A and 215B of the heat shield assembly 120 using high temperature sealant to allow any flammable fluid to be contained within the fluid containment volume of the heat shield assembly 120. The heat shield assembly 120 is formed by performing blocks 1105, 1110, 1115, and 1120. At block 1125, the heat shield assembly 120 is mounted to the strut 115. In some cases, the strut 115 is mounted onto the aircraft 100 (e.g., the wing 105 and engine 110 of the aircraft 100) prior to mounting the heat shield assembly 120 to the strut 115. At block 1130, side access panels with integral frames are installed onto the aircraft 100.

Figure 12:
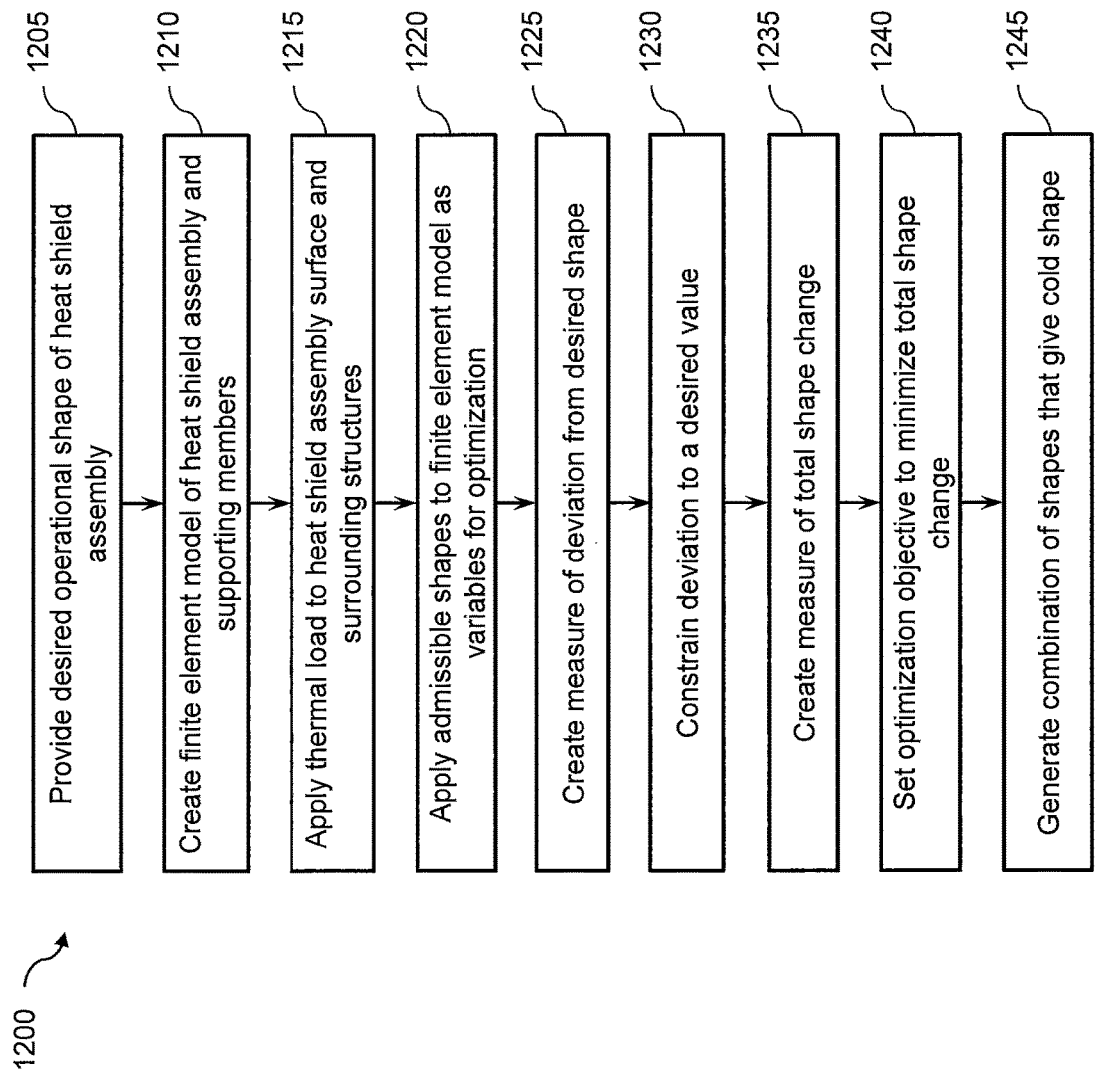
FIG. 12 illustrates a flow diagram of an example process for determining a shape of a heat shield assembly in accordance with one or more examples of the present disclosure.

FIG. 12 illustrates a flow diagram of an example process 1200 for determining a shape of a heat shield assembly in accordance with one or more examples of the present disclosure. Note that one or more operations may be combined, omitted, and/or performed in a different order as desired. Process 1200 can be performed with, for example, software as would be understood by one skilled in the art. Such software can include finite element analysis software using typical or custom settings and/or scripts.

At block 1205, a desired operational shape of a heat shield assembly is provided. The desired operational shape may provide an initial definition of a heat shield assembly (e.g., the heat shield assembly 120). At block 1210, a finite element model (FEM) of the provided operational shape of the heat shield assembly is generated. At block 1215, a thermal load is applied to a surface of the heat shield assembly and any surrounding structures (e.g., strut). At block 1220, admissible shapes are applied as variables to the FEM.

At block 1225, a measure of deviation from desired shapes is determined. The deviation may be a relative displacement due to the thermal load. At block 1230, the deviation is constrained to a desired value. The deviation may be constrained in an optimization solver. For example, the desired value may be within one-sixteenth of an inch. At block 1235, a measure of a total change relative to the initial definition of the heat shield assembly is determined. The total shape change may be a summation of the shape variables provided at block 1220. At block 1240, an optimization object is set to minimize the total shape change. At block 1245, a combination of shapes that give a desired cold shape of the heat shield assembly is generated (e.g., by an optimizer).

Thus, in some examples, the process 1200 may be utilized to accurately predict the shape of a hot heat shield assembly or portion thereof (e.g., a hot flexible member of the heat shield assembly). Components of the heat shield assembly may be fabricated in a cold shape that is predicted to match a desired aerodynamic shape while hot (e.g., during a cruise phase of flight when fuel efficiency is important). In this regard, for example, the flexible member may be flexible and change shape in response to heat in a predetermined manner.

Figure 13:
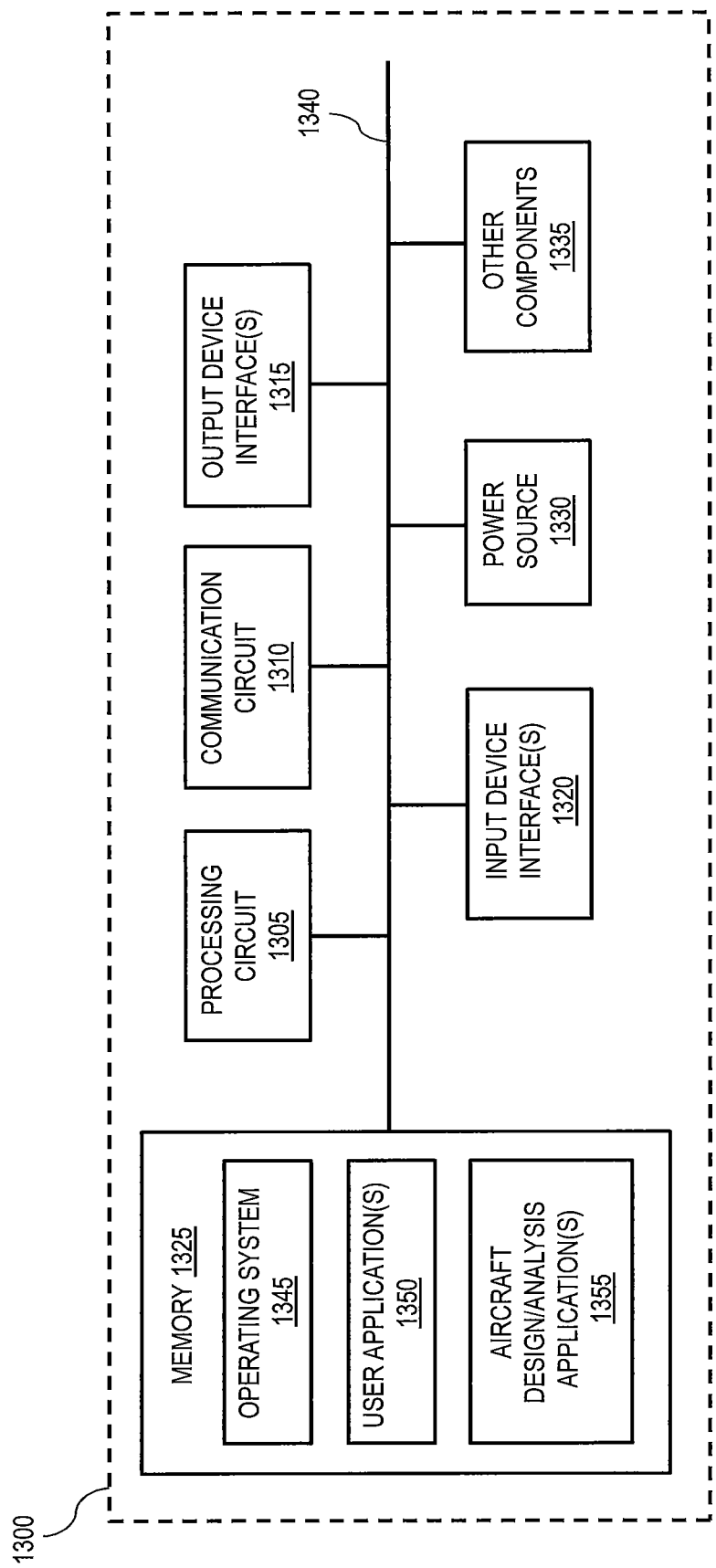
FIG. 13 illustrates an example computing device in which a shape of a heat shield assembly can be determined in accordance with one or more embodiments of the present disclosure.

FIG. 13 illustrates an example computing device 1300 in which a shape of a heat shield assembly can be determined in accordance with one or more examples of the present disclosure. The computing device 1300 includes a processing circuit 1305, a communication circuit 1310, one or more output device interfaces 1315, one or more input device interfaces 1320, a memory 1325, a power source 1330, other components 1335, and a bus 1340.

The processing circuit 1305 may execute machine readable instructions (e.g., software, firmware, or other instructions) stored in the memory 1325. In an example, the processing circuit 1305 may execute the instructions to perform processes described herein, such as the example process 1200 provided in FIG. 12. The processing circuit 1305 may be, may include, or may be a part of, one or more logic circuits (e.g., encryption logic circuits, decryption logic circuits, etc.) in the computing device 1300. The processing circuit 1305 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), codecs, and/or other processing devices.

The communication circuit 1310 may be configured to handle, manage, or otherwise facilitate wired and/or wireless communication between various components of the computing device 1300 and between the computing device 1300 and another computing device. In an example, the communication circuit 1310 may include a wireless communication circuit (e.g., based on the IEEE 802.11 standard, Bluetooth™ standard, ZigBee™ standard, or other wireless communication standard), cellular circuit, or other appropriate communication circuit. In some cases, the communication circuit 1310 may be configured for a proprietary wireless communication protocol and interface. The communication circuit 1310 may include, or may be in communication with, an antenna for wireless communication. Thus, in one example, the communication circuit 1310 may handle, manage, or otherwise facilitate wireless communication by establishing a wireless link to a handheld device, base station, wireless router, hub, or other wireless networking device.

The communication circuit 1310 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. Alternatively or in addition, the communication circuit 1310 may support proprietary wired communication protocols and interfaces. The communication circuit 1310 may be configured to communicate over a wired link (e.g., through a network router, switch, hub, or other network device) for purposes of wired communication. A wired link may be implemented with a power-line cable, coaxial cable, fiber-optic cable, or other cable or wires that support corresponding wired network technologies.

The output device interface(s) 1315 may couple the computing device 1300 to one or more output devices. The output device interface(s) 1315 may include a graphics and/or audio driver card, graphics and/or audio driver chip, and/or graphics and/or audio driver processor. The output device(s) may enable the computing device 1300 to provide output information to a user. For example, the output device (s) may include one or more display devices. The display device(s) may be utilized to display information to the user, such as results and menu options associated with determining a shape of a heat shield assembly or portion thereof (e.g., flexible member). As an example, the display devices may display temperature information for different portions of the heat shield assembly or component thereof to facilitate optimization of the shape of the heat shield assembly.

The input device interface(s) 1320 may couple the computing device 1300 to one or more input devices. The input device(s) may enable the user to provide (e.g., enter) data and commands to the computing device 1300. The input device(s) may include, for example, an audio sensor, a microphone, a camera (still or video), a voice recognition system, a keyboard (e.g., a physical or virtual keyboard), a cursor control device (e.g., a mouse), a touchscreen, and/or other devices for providing user input to the computing device 1300. In this regard, the user input may be received in any form, such as audio (e.g., speech), visual, and/or tactile. In some cases, the input device may be integrated with and may also be a part of a display, such as in a touch screen display. As an example, the user input may include information associated with determining a shape of the heat shield assembly, such as information associated with a desired operational shape of the heat shield assembly (e.g., block 1205), applied thermal load (e.g., block 1215), admissible shapes (e.g., block 1220), and/or other information.

The memory 1325 may be utilized to store information for facilitating operation of the computing device 1300. By way of non-limiting example, the memory 1325 may include non-volatile memory, such as read-only memory (ROM), programmable ROM (PROM), erasable programmable ROM (EPROM), electrically erasable programmable (EEPROM), flash, non-volatile random-access memory (NVRAM), etc. The memory 1325 may include volatile memory, such as random-access memory (RAM), dynamic RAM (DRAM), static RAM (SRAM), etc. The memory 1325 may store information such as instructions to be executed by the various components (e.g., the processing circuit 1305) of the computing device 1300, buffered information to be transmitted (e.g., by the communication circuit 210) such as truly random bit streams and encrypted data, and/or other information.

The memory 1325 may store various software packages, such as an operating system (OS) 1345, user application(s) 1350, and/or aircraft design/analysis application(s) 1355. The OS 1345 may be any software that manages resources (e.g., hardware resources) of the computing device 1300 and provides common services for other programs (e.g., user application(s) 1350 and/or aircraft design/analysis application(s) 1355). The user application(s) 1350 may include, by way of non-limiting example, a web browsing application, a database application, a word processing application, an electronic mail application, a point-of-sale application, and/or other applications. The aircraft design/analysis application(s) 1355 may include, by way of non-limiting example, instructions to facilitate aircraft design, such as facilitate heat analysis and/or heat management of an aircraft. In an example, the aircraft design/analysis application(s) 1355 may include instructions to facilitate design of a heat shield assembly or component thereof (e.g., flexible member).

In an example, instructions associated with the OS 1345, user application(s) 1350, aircraft design/analysis application(s) 1355, and/or other applications, may be executed by the processing circuit 1305 to implement the steps and/or operations described herein, such as in FIG. 12. In this regard, in an aspect, the aircraft design/analysis application(s) 1355 may include instructions that, when executed by the processing circuit 1305, cause the processing circuit 1305 to perform the process 1200 of FIG. 12. The user application(s) 1350 and/or aircraft design/analysis application(s) 1355 may take the form of a computer program product embodied in one or more machine reachable media having machine readable program code embodied thereon. In some cases, the instructions may be read into the memory 1325 from another machine readable medium or from another system and/or device, for example, via the communication circuit 1310. Alternatively and/or in addition, hardwired circuitry may be used in place of or in combination with the software instructions to implement the steps and/or operations described herein. As used herein, the term machine readable medium may refer to any medium that participates in providing instructions to the processing circuit 1305 for execution. Any combination of one or more machine readable media may be utilized. As one example, the machine readable medium may include a machine readable storage medium, such as a non-transitory machine readable storage medium (e.g., the memory 1325).

Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Examples described above illustrate but do not limit the invention. It should also be understood that numerous modifications and variations are possible in accordance with the principles of the present invention. Accordingly, the scope of the invention is defined only by the following claims and their equivalents.

What is claimed is:

1. A heat shield assembly comprising:
   a flexible member comprises an upper piece and a lower piece bonded together, wherein the upper piece comprises a plurality of ridges and a plurality of depressions;
   a plurality of frame members disposed on the flexible member; and
   a plurality of mounting structures configured to directly mount the heat shield assembly to a strut of an airplane, wherein each of the plurality of mounting structures is disposed on one of the plurality of frame members.

2. The heat shield assembly of claim 1, wherein the plurality of mounting structures comprises a plurality of clevis fittings.

3. The heat shield assembly of claim 1, wherein the flexible member comprises one or more longitudinal stiffeners.

4. The heat shield assembly of claim 1, wherein the flexible member comprises a ceramic matrix composite.

5. The heat shield assembly of claim 1, wherein the upper piece is a first single continuous piece and the lower piece is a second single continuous piece.

6. The heat shield assembly of claim 1, wherein a hole is defined on each of the plurality of ridges.

7. The heat shield assembly of claim 1, wherein an air scoop is defined on a sloped portion between a first ridge of the plurality of ridges and a first depression of the plurality of depressions.

8. The heat shield assembly of claim 1, further comprising a longitudinal panel coupled to the plurality of frame members to define a flammable fluid containment volume in an upper portion of the heat shield assembly.

9. The heat shield assembly of claim 1, wherein the plurality of mounting structures comprises flexible mounts at an aft portion of the heat shield assembly.

10. The heat shield assembly of claim 9, wherein each flexible mount is configured to rotate from a first position to a second position in response to a change in temperature of the heat shield assembly.

11. The heat shield assembly of claim 1, wherein the plurality of mounting structures comprises pivot mounts at a front portion of the heat shield assembly.

12. The heat shield assembly of claim 11, wherein each pivot mount is fixedly attached to a respective one of the plurality of frame members in a longitudinal direction.

13. An aircraft comprising the heat shield assembly of claim 1, wherein the aircraft further comprises:
   a wing;
   an engine; and
   the strut coupling the engine to the wing,
   wherein:
      an upper surface of the flexible member faces the strut, and
      a bottom surface of the flexible member faces the engine.

14. A method of determining a shape of the heat shield assembly of claim 1, the method comprising:
   providing a first shape of the heat shield assembly;
   generating a finite element model (FEM) of at least the first shape;
   applying a thermal load to a portion of the FEM associated with a surface of the first shape;

determining a deviation for each of a plurality of shapes based on the applying;

determining a shape change based at least on the deviation; and determining the shape of the heat shield assembly based on the shape change.

15. A method comprising:

forming an assembly fixture associated with a heat shield assembly, wherein the assembly fixture comprises a plurality of frame members;

binding a first continuous piece to a second continuous piece to form a flexible member, wherein an upper surface of the first continuous piece comprises a plurality of ridges and a plurality of depressions;

mounting the flexible member to the assembly fixture;

attaching a plurality of mounting structures, wherein each of the plurality of mounting structures is attached to one of the plurality of frame members; and mounting the plurality of mounting structures to corresponding mounting structures of a strut.

16. The method of claim 15, wherein the plurality of mounting structures comprises flexible mounts at an aft portion of the heat shield assembly, and wherein each flexible mount is rotatable from a first position to a second position in response to a change in temperature of the heat shield assembly.

17. The method of claim 15, wherein the plurality of mounting structures comprises pivot mounts at a front portion of the heat shield assembly, and wherein each pivot mount is fixedly attached to a respective one of the plurality of frame members in a longitudinal direction.

18. The method of claim 15, wherein the binding comprises sintering the first continuous piece and the second continuous piece together.

19. A heat shield assembly comprising:

a flexible member;

a plurality of frame members disposed on the flexible member;

a plurality of mounting structures configured to directly mount the heat shield assembly to a strut of an airplane, wherein each of the plurality of mounting structures is disposed on one of the plurality of frame members; and a longitudinal panel coupled to the plurality of frame members to define a flammable fluid containment volume in an upper portion of the heat shield assembly.

20. The heat shield assembly of claim 19, wherein the flexible member comprises an upper piece and a lower piece bonded to the upper piece, and wherein a perforation extends through the upper piece.

* * * * *